i

US008558499B2

(12) United States Patent
Ozaki et al.

(10) Patent No.: US 8,558,499 B2
(45) Date of Patent: Oct. 15, 2013

(54) CONTROLLER APPARATUS FOR ELECTRIC VEHICLE

(75) Inventors: Takayoshi Ozaki, Iwata (JP); Koichi Okada, Iwata (JP); Takeshi Kanda, Iwata (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 13/613,670

(22) Filed: Sep. 13, 2012

(65) Prior Publication Data

US 2013/0002179 A1  Jan. 3, 2013

Related U.S. Application Data

(63) Continuation of application No. PCT/JP2011/056183, filed on Mar. 16, 2011.

(30) Foreign Application Priority Data

Mar. 26, 2010  (JP) .................................. 2010-072057

(51) Int. Cl.
*H02P 27/04*  (2006.01)

(52) U.S. Cl.
USPC ........... 318/800; 318/722; 318/801; 318/430; 318/432; 361/43; 700/143; 180/65.275; 180/65.285

(58) Field of Classification Search
USPC ............... 318/123, 134, 136, 400.01, 400.07, 318/400.21, 430, 432, 440, 362, 722, 801, 318/800; 324/500, 765.01; 700/293, 294, 700/143; 369/30.24, 53.42; 361/43, 88, 361/93.1; 340/3.43; 74/388 PS; 180/65.275, 180/65.285

See application file for complete search history.

(56) References Cited

U.S. PATENT DOCUMENTS 5,969,919 A * 10/1999 Kobayashi et al. ............. 361/23
6,041,884 A *  3/2000 Shimizu et al. ............... 180/443
6,704,632 B2    3/2004 Itoh (Continued)

FOREIGN PATENT DOCUMENTS

JP  2-84003  3/1990
JP  2001-310743  11/2001

(Continued)

OTHER PUBLICATIONS

English Translation of the International Preliminary Report on Patentability mailed Nov. 1, 2012 in corresponding International Patent Application No. PCT/JP2011/056183.

(Continued)

*Primary Examiner* — Anthony M Paul

(57) ABSTRACT

To provide a controller apparatus of a type, in which the controller is given the redundancy so that the control of the drive motor can be properly performed at all times when an abnormality such as the failure of the controller occurs, with the reliability consequently increased, a plurality of controllers are provided, each including a power circuit for outputting a drive current for the drive motor and a control circuit, which is a light electric circuit, for controlling the power circuit in response to a motor drive command fed from a higher control. An abnormality determiner is provided for determining an abnormality occurring in the controller then in use according to a prescribed rule and then generating a switching signal. A switch is provided, which is operable in response to the switching signal to change the controller then in a state of functioning relative to the drive motor.

15 Claims, 15 Drawing Sheets

(56) References Cited

U.S. PATENT DOCUMENTS

| | | |
|---|---|---|
| 7,482,769 B2 * | 1/2009 | Kutsuna et al. ............ 318/254.1 |
| 7,891,451 B2 * | 2/2011 | Oyobe et al. ............ 180/65.275 |
| 2001/0051845 A1 | 12/2001 | Itoh |

FOREIGN PATENT DOCUMENTS

| | | |
|---|---|---|
| JP | 2005-287129 | 10/2005 |
| JP | 2006-335181 | 12/2006 |
| JP | 2007-306713 | 11/2007 |
| JP | 2008-168790 | 7/2008 |
| JP | 2008-172975 | 7/2008 |
| JP | 2008-245497 | 10/2008 |
| JP | 2009-74583 | 4/2009 |

OTHER PUBLICATIONS

International Search Report of PCT/JP2011/056183 mailed Jun. 7, 2011.

* cited by examiner

CONTROLLER APPARATUS FOR ELECTRIC VEHICLE

CROSS REFERENCE TO THE RELATED APPLICATION

This application is a continuation application, under 35 U.S.C. §111(a), of international application No. PCT/JP2011/056183, filed Mar. 16, 2011, which claims Convention priority to Japanese patent application No. 2010-072057, filed Mar. 26, 2010, the entire disclosure of which is herein incorporated by reference as a part of this application.

BACKGROUND OF THE INVENTION

1. Field of the Invention

The present invention relates to a controller apparatus for driving a motor in an electrically powered automotive vehicle, or an electric vehicle for short, that is used to drive such electric vehicle and, more particularly, to the controller apparatus for the electric vehicle of a kind, in which a controller or a component part incorporated therein is provided in a plural number to have a redundancy.

2. Description of Related Art

Electric vehicles are available in various types including, inter alia, the type that is driven solely by an electrically powered drive motor or the hybrid type that is driven by a concurrent use of the electrically powered drive motor and the internal combustion engine. In those electric vehicles, the manner of installation of the electric drive motor includes an in-wheel motor system, in which the electric drive motor is installed inside each of the vehicle wheels, and a system in which the electric drive motor mounted on the vehicle body is distributed by means of a differential. Whatever the particular manner of installation of the electric drive motor is employed, the use is generally made of a controller made up of a control circuit unit and a power circuit unit, in addition to a higher control means for generating a motor drive command from information on, for example, a handlebar and/or an accelerator.

In discussing the prior art pertinent to the present invention, reference will be made the in-wheel motor system in the following description. FIG. 16 of the accompanying drawings schematically illustrates the conventional in-wheel motor driving system, which includes a wheel support bearing unit A for rotatably supporting a vehicle wheel W, an electric drive motor B, and a reduction gear unit C for reducing the number of revolutions, i.e., the rotational speed, of the drive motor B and then transmitting the reduced rotational speed of the drive motor B to an inner member 2, that is a rotatable ring of the wheel support bearing unit A, all operatively associated with each other to form the in-wheel motor drive mechanism that is an assembly. The drive motor B is controlled by a controller 53 in response to a motor drive command a outputted from, for example, an electric control unit (ECU). The controller 53 is made up of a control circuit unit 54, which is a light electric circuit (a low voltage circuit or a low current circuit), and a power circuit unit 55 which is a heavy electric circuit.

[Patent Document 1] JP Laid-open Patent Publication No. 2008-168790
[Patent Document 2] JP Laid-open Patent Publication No. 2008-172975

SUMMARY OF THE INVENTION

In the electric vehicle, the failure of the drive motor B, used to drive the electric vehicle, and the failure of the controller 53 used to control such drive motor are fatal. Particularly in the electric vehicle, the driving torque of the drive motor B is high and electromagnetic noses generated from the drive motor itself is considerable. Also, during the travel of the electric vehicle, the possibility is high that the electric vehicle is affected by a substantial amount of external electromagnetic noises and/or electrostatic noises. Moreover, the controller 53 thereof is mounted on the electric vehicle, it is used under the severe environment that is vibrated.

The motor control in the electric vehicle generally takes places according to a system using a microcomputer, but in the event that the electromagnetic noises or the electrostatic noises, discussed hereinabove, affect the microcomputer, there is a high possibility that the controller 53 itself fails to operate normally and the drive motor B is no longer driven. In particular, where the torque of the drive motor B, which is a drive source of the electric vehicle, is transmitted to the vehicle wheel W through the reduction gear unit C having a high reduction gear ratio, a variation in torque of the drive motor B resulting from destabilization of the motor control will be amplified, resulting in a torque change in the wheel W supporting a tire, and, therefore, the reliability of the controller 53 used to control the drive motor B is of prime importance.

In view of the foregoing, an object of the present invention is to provide a controller apparatus of a type, in which the controller is given the redundancy so that the control of the drive motor can be properly performed at all times when an abnormality such as the failure of the controller to operate properly occurs in the controller, with the reliability consequently increased.

In order to accomplish the foregoing object of the present invention, there is provided, in accordance with a first aspect of the present invention, a controller apparatus for a drive motor for driving an electrically powered automotive vehicle, which comprises a plurality of controllers each including a power circuit unit for outputting an electric drive current for the drive motor and a control circuit unit, which is a light electric circuit, for controlling the power circuit unit in response to a motor drive command fed from a higher control unit; an abnormality determining unit for determining an abnormality occurring in the controller then in use according to a prescribed rule and then generating a switching signal; and a switching unit operable in response to the switching signal, outputted from the abnormality determining unit, to change the controller then in a state of functioning relative to the drive motor. It is to be noted that the wording of "change the controller then in a state of functioning relative to the drive motor" may include either one or both of the meanings of "change the controller held in a condition connecting with the drive motor in response to the switching signal" and "change the controller, then held in an active state, that is, in a state ready to operate, as it is electrically powered on, in response to the switching signal".

According to the construction described above, the use is made of the plurality of the controllers, each including the power circuit unit and the control circuit unit, that are selectively used and, when the controller then in use is determined as having an abnormality such as, for example, a failure, the controller then in use is switched over to another controller. Because of this, the reliability is increased. In the electrically powered automotive vehicle, the failure of the drive motor, which is used to drive the electric vehicle, and that of the controller for controlling it are fatal and, moreover, they are used under the environment full of failure causalities where electromagnetic noises and/or electrostatic noises act, but the redundant structure, in which the plurality of the controllers are employed, is effective to assure the reliability.

According to the first aspect of the present invention referred to above, the control circuit unit in each of the plurality of the controllers may be electrically powered on at all times and be held in a standby state with the motor drive command inputted thereto, in which case in the event that the abnormality determining unit determines that the controller then in use is abnormal and therefore generates the switching signal, the switching unit causes another controller in a state of functioning relative to the drive motor. It is to be noted that the term "standby state" referred to hereinbefore and hereinafter in this specification is to be construed as meaning the condition in which when switched the operation is quickly enabled.

Since the control circuit unit(s) of the spare controller(s) is/are held at all times under the standby state as described above, the motor control can be accomplished by immediately changing the control circuit unit when the abnormality has occurred, and the changing can be accomplished with the time lag eliminated, which would result in the motor being uncontrollable or halted.

The present invention in accordance with a second aspect thereof also provides a controller apparatus for a drive motor for driving an electrically powered automotive vehicle, which comprises a controller including a power circuit unit for outputting an electric drive current for the drive motor and a control circuit unit, which is a light electric circuit, for controlling the power circuit unit in response to a motor drive command fed from a higher control unit, the controller having, as the control circuit unit, a plurality of control circuit units that are selectively used relative to the same power circuit unit; an abnormality determining unit for determining an abnormality occurring in the control circuit unit then in use according to a prescribed rule and then generating a switching signal; and a switching unit operable in response to the switching signal, outputted from the abnormality determining unit, to switch over to a different control circuit unit then in a state capable of functioning relative to the power circuit unit. It is to be noted that in this case the wording of "switch over to a different control circuit unit then in a state capable of functioning relative to the power circuit unit" may include either one or both of the meanings of "switch over to a different control circuit unit held in a condition connecting with the drive motor in response to the switching signal" and "switch over to a different control circuit unit then held in an active state in response to the switching signal".

According to the construction described above, in the event that the abnormality such as, for example, a failure occurs in the control circuit unit of the controller then in use, the control circuit unit then in use is switched over to the different control circuit unit. For this reason, the reliability is increased. In this construction, since what is rendered to be a redundant structure is only the control circuit unit(s) which is/are light electric circuit(s), it can be rendered to be the redundant construction effective to increase the reliability at a reduced cost as compared with the case in which the controller in its entirety is employed in a plural number.

In the construction described above, of the plurality of the control circuit units, the control circuit unit that is used at the time that an abnormality occurs in another control circuit unit may be of a circuit configuration using mainly an analog circuit having a resistance to electromagnetic noises. If it is a circuit configuration using mainly the analog circuit having the resistance to the electromagnetic noises, in the event that the abnormality occurs in the control circuit unit during the travel of the electric vehicle under the environment with large number of the electromagnetic noises, the possibility of occurring such abnormality again after the switching can be suppressed, thus further increasing the reliability.

In the construction described above, where the control circuit unit is so structured as to have a plurality of redundant structures, the plurality of the control circuit units may held in a standby state by being electrically powered on at all times, in which case in the event that the abnormality determining unit determines that the controller then in use is abnormal and therefore generates the switching signal, the switching unit causes another control circuit unit in a state of being connected to the drive motor. Even in this case, the changing of the control circuit unit in use can be accomplished immediately in the event of the occurrence of the abnormality and the changing can be accomplished with the time lag eliminated as far as possible, which would result in the motor being uncontrollable or halted.

Furthermore, the present invention in accordance with a third aspect thereof provides a controller apparatus for a drive motor for driving an electrically powered automotive vehicle, which comprises a controller including a power circuit unit for outputting an electric drive current for a drive motor and a control circuit unit, which is a light electric circuit, for controlling the power circuit unit in response to a motor drive command fed from a higher control unit; the controller having, as the power circuit unit, a plurality of power circuit units that are selectively used relative to the same control circuit unit; an abnormality determining unit for determining an abnormality occurring in the power circuit unit then in use according to a prescribed rule and then generating a switching signal; and a switching unit operable in response to the switching signal, outputted from the abnormality determining unit, to change the power circuit unit then in a state of functioning relative to the drive motor. It is to be noted that even in this case the wording of "change the power circuit unit then in a state of functioning relative to the drive motor" may include either one or both of the meanings of "change the power circuit unit held in a condition connecting with the drive motor in response to the switching signal" and "change the power circuit unit then held in an active state in response to the switching signal".

According to the construction described above, in the event that the abnormality such as, for example, a failure occurs in the power circuit unit of the controller then in use, the power circuit unit then in use is switched over to the different power circuit unit. For this reason, the reliability can be increased. In this construction, since what is rendered to be a redundant structure is only the power circuit unit(s), it can be rendered to be the redundant construction effective to increase the reliability at a reduced cost as compared with the case in which the controller in its entirety is employed in a plural number.

In the practice of any one of the first to third aspects of the present invention, the drive motor referred to above may be of a type capable of torque transmitting to a vehicle wheel of the electrically powered automotive vehicle through a reduction gear unit having a reduction gear ratio of 8 or higher. Also, the reduction gear unit referred to above may also be a cycloidal gear reducer. Where the torque transmission is made to the vehicle wheel through the reduction gear unit having a high reduction gear ratio, the torque variation of the drive motor, which results from the instability of the motor control, does, after having been amplified, lead to the torque variation of the vehicle wheel having a tire mounted thereon and, therefore, the reliability of the controller for the drive motor is of prime importance. Accordingly, the effects of the redundant configuration of the present invention are efficiently exhibited.

Where the drive motor referred to above is of a type capable of torque transmitting to the vehicle wheel of the electric vehicle through the reduction gear unit having the reduction gear ratio of 8 or higher, the reduction gear unit, the drive motor and a wheel support bearing unit may be assembled together to define an in-wheel motor drive mechanism and the reduction gear unit is positioned within the vehicle wheel.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF PREFERRED EMBODIMENTS

Figure 1:
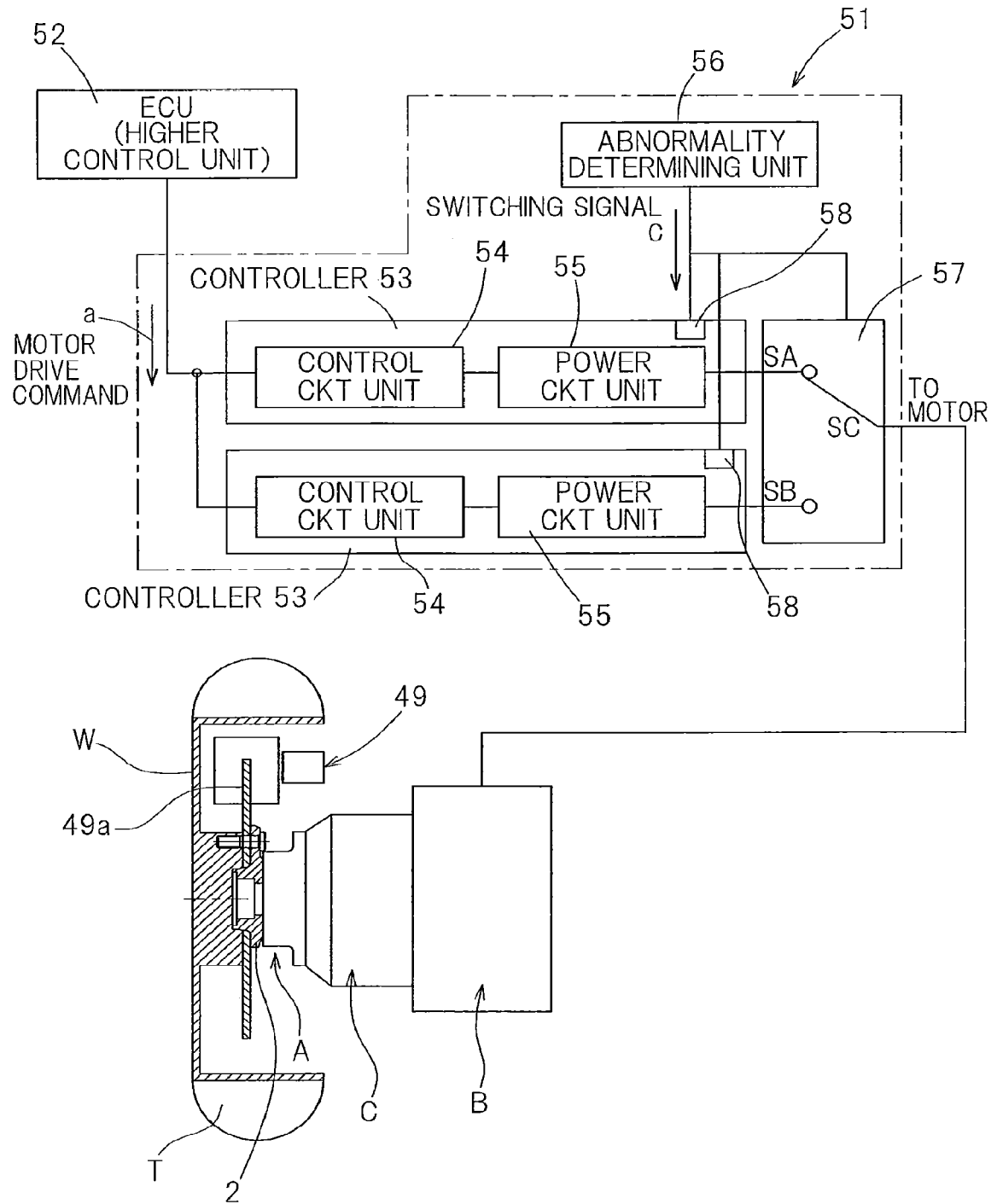
FIG. 1 is a diagram showing a conceptual construction of a controller apparatus for an electric vehicle designed in accordance with a first preferred embodiment of the present invention, and a longitudinal sectional view with a portion cut out of an electrically driven motor, a reduction gear unit, a wheel support bearing unit and a vehicle wheel.

A first preferred embodiment of the present invention will first be described with particular reference to FIG. 1, which illustrates a vehicle wheel W, which is one of vehicle wheels in an electrically powered automotive vehicle, and the surroundings thereof. A wheel support bearing unit A for rotatably supporting the vehicle wheel W, a drive motor B and a reduction gear unit C for reducing the rotational speed of the drive motor B and then transmit the reduced rotational speed of the drive motor B to an inner member 2, which is a rotatable ring of the wheel support bearing unit A, cooperate with each other to define an in-wheel motor drive mechanism, which is an assembly of those components. The wheel W has a tire T mounted thereon. The inner member 2 of the wheel support bearing unit A has a brake disc 49a of a brake 49 fitted thereto together with the vehicle wheel W. The drive motor B of the in-wheel motor drive mechanism referred to above is driven by a controller apparatus 51 for the electric vehicle. This drive motor B is employed in the form of a synchronous motor or the like that is driven by a three phase current. A specific example of the in-wheel motor drive mechanism will be described later with reference to FIGS. 13 to 15.

The controller apparatus 51 for the electric vehicle controls the drive motor B in accordance with a motor drive command a applied from an electric control unit (ECU) 52 forming a higher control means and does, in the embodiment now under discussion, include a plurality of, for example, two, controllers 53 that are selectively brought into use. The electric control unit 52 has a function of outputting the motor drive command a in dependence on the amount of operation of an accelerator (the amount of depression of an accelerator pedal) (not shown) of the electric vehicle. This electric control unit 52, however, may be of a type capable of outputting the motor drive command a by correcting the amount of operation of the accelerator by means of an anti-lock brake system, an attitude control system or the like.

Each of the controllers 53 is made up of a control circuit unit 54, which is a light electric circuit (a low voltage circuit or a low current circuit), and a power circuit unit 55 which is mainly a heavy electric circuit. The power circuit unit 55 is an inverter circuit for applying a direct current electricity, which is supplied from a battery (not shown) to the drive motor B. In particular, the power circuit unit 55 converts a motor drive current for a motor coil (not shown) of each phase, used to generate a rotating magnetic field of the drive motor, in accordance with a command of the control circuit unit 54 and then applies it to the drive motor B. Each of the controllers 53 is mainly made up of a power circuit element such as, for example, a switching transistor. The power circuit unit 54 includes a PWM driver (not shown) for efficiently driving a transistor built therein, and a motor drive current chopped by the PWM driver is applied to the drive motor B.

The control circuit unit 54 is a light electric circuit operable to control the power circuit unit 55 in response to the motor drive command a supplied from the electric control unit (ECU) 52 that is the higher control means. This control circuit unit 54 is a means for calculating the value of an electric current to be supplied across the drive motor and the timing thereof in response to the command from the electric control unit (ECU) 52 and plays a role of applying the command to the power circuit unit 55 to perform various controls including, inter alia, a feedback control of the rotational speed. It is to be noted that the PWM driver referred to previously may be provided in the control circuit unit 54 in place of the power circuit unit 55.

The controller apparatus 51 for the electric vehicle described above makes use of a plurality of controllers 53 each having such a function as hereinabove described. The controller apparatus 51 is also provided with an abnormality determining unit 56 for determining an abnormality occurring in the controller 53 then in use according to a prescribed rule to thereby generate a switching signal c, and an external switching unit 57 and internal switching units 58. The external switching unit 57 and the internal switching units 58 are operable in response to the switching signal c, outputted by the abnormality determining unit 56, to change the controller then held in a condition ready to function relative to the drive motor B, that is, to switch over the controller then in use to another controller. The external switching unit 57 is provided outside and on an output side of the controllers 53 and is operable in response to the switching signal c to switch the controller then held in a condition connected to the drive motor B from one to another. Each of the internal switching units 58 is provided inside each of the controllers and is operable in response to the switching signal c to switch the respective controller 53 into one of an active mode, that is, a mode that can operate when powered on, and a halted mode, for example, a mode that is inoperable with the power source interrupted.

The abnormality determining unit 56 is a means for determining an abnormality occurring in any one of the control circuit unit 54 and the power circuit unit 55 in the controller 53 then in use. In the event that the abnormality determining unit 56 determines the presence of an abnormality in either one of the control circuit unit 54 and the power circuit unit 55, it outputs the switching signal c. The abnormality determination may determine not only the occurrence of a failure, but also a low-grade or slight abnormality that has not yet led to the failure. This abnormality determination is such that, in the control circuit unit 54, comparison is made between an input to the control circuit unit 54 and the rotational speed of the drive motor B or the detected value of the electric motor current and the abnormality is then determined when the result of such comparison fails to fall within a predetermined range. The predetermined range referred to above may suffice to be arbitrarily determined. The abnormality determination of the power circuit unit 55 is carried out by comparing the input to the power circuit unit 55 with the rotational speed of the drive motor B or the detected value of the electric motor current and the abnormality is then determined when the result of such comparison fails to fall within a predetermined range.

The switching unit 57 on the external side is employed in the form of a switching circuit operable in response to the switching signal c to select one of respective output terminals of the power circuit units 55 of the plurality of the controllers 53 that is to be connected with an input terminal of the drive motor B. In other words, the switching unit 57 on the external side is a switching means for switching the contact point on the input side which is connected to a single contact point SC on the output side between two contact points SA and SB.

The switching units 58 on the respective internal sides are of a type capable of, for example, connecting a motor drive battery, which will serve as a power source for the respective control circuit units 54 and a power source for the respective power circuit units 55, with only one of the controllers 53, then actually in use, and thus switches or changes the controllers 53 to establish such connection in response to the switching signal c. It is, however, to be noted that without the use of the switching unit 58 on the internal side, the control circuit unit 54 of each of the controllers 53 may be always connected with and, hence, electrically powered by a power source (not shown) and may be always held in a standby state by supplying thereto a motor drive command a outputted by the electric control unit 52. Also, even with the power circuit units 55, although the input terminal is connected at all times with the battery, no electric current may be outputted during a period in which the output terminal is isolated or disconnected by the switching unit 57.

According to the controller apparatus 51 for the electric vehicle of the structure described herein above, the use is made of the plurality of the controllers 53, each including the power circuit unit 55 and the control circuit unit 54, which are selectively utilized, and, in the event that it is determined that an abnormality such as, for example, failure has occurred in the controller 53 then in actual use, the controller 53 then in actual use can be switched over to the other controller 53. Accordingly, the reliability can be increased. While as hereinbefore discussed, in the electric vehicle, the failure of the drive motor for driving the electric vehicle and/or the controller for controlling it is a fatal matter and, yet, the drive motor and the controller are used under the severe environment full of causes of failure in which the electromagnetic noises and/or the electrostatic noises prevail, the use of the plurality of the controllers 53 to render the apparatus as a whole to have a redundancy as discussed above is effective to secure the reliability. Also, with respect to the control circuit unit 54 in each of the plurality of the controllers 53, where it is electrically powered on at all times and is held in the standby state with the motor drive command a inputted thereto, the motor control can be accomplished with the switching taking place quickly in response to the occurrence of the abnormality and the switching can be accomplished with no time lag in which the drive motor falls in position to be uncontrollable or fails to drive.

FIGS. 2 to 12 illustrate the controller apparatus 51 for the electric vehicle designed respectively in accordance with second to twelfth preferred embodiments of the present invention. Those second to twelfth embodiments are, unless otherwise specifically described, are of the structure similar to the previously described first embodiment of the present invention.

Figure 2:
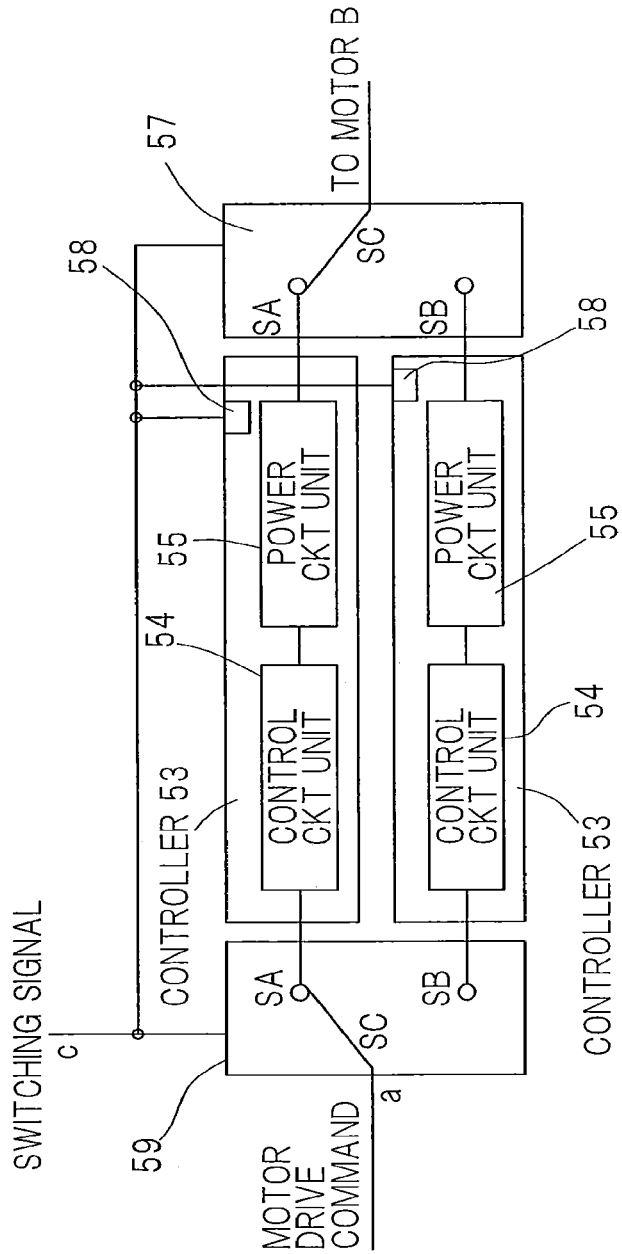
FIG. 2 is a block diagram showing a conceptual construction of the controller apparatus for an electric vehicle designed in accordance with a second preferred embodiment of the present invention.

In the second embodiment shown in FIG. 2, as the switching unit operable in response to the switching signal c, the use is made of a switching unit 59 on the input side and the switching unit 57 on the output side, each of which forms the switching unit on the external side. The input side switching unit 59 is comprised of a switching circuit operable in response to the switching signal c to switch the input terminal to which the motor drive current a is inputted between two input terminals of the respective control circuit units 54 of those two controllers 53. On the other hand, the output side switching unit 57 is comprised of a switching circuit operable in response to the switching signal c to switch the output terminal that is connected with the drive motor B between two output terminals of the respective power circuit units 55 of the two controllers 53. Also, each of the controllers 53 is provided with the switching unit 58 on the internal side referred to previously. Other structural features are similar to those shown in and described in connection with the first embodiment of the present invention with particular reference to FIG. 1. As described above, where the switching units 59 and 57 are employed on the input and output sides, respectively, the controller 53 that is not in use then can be isolated from the input and the output and, therefore, the operation is further assured.

Figure 3:
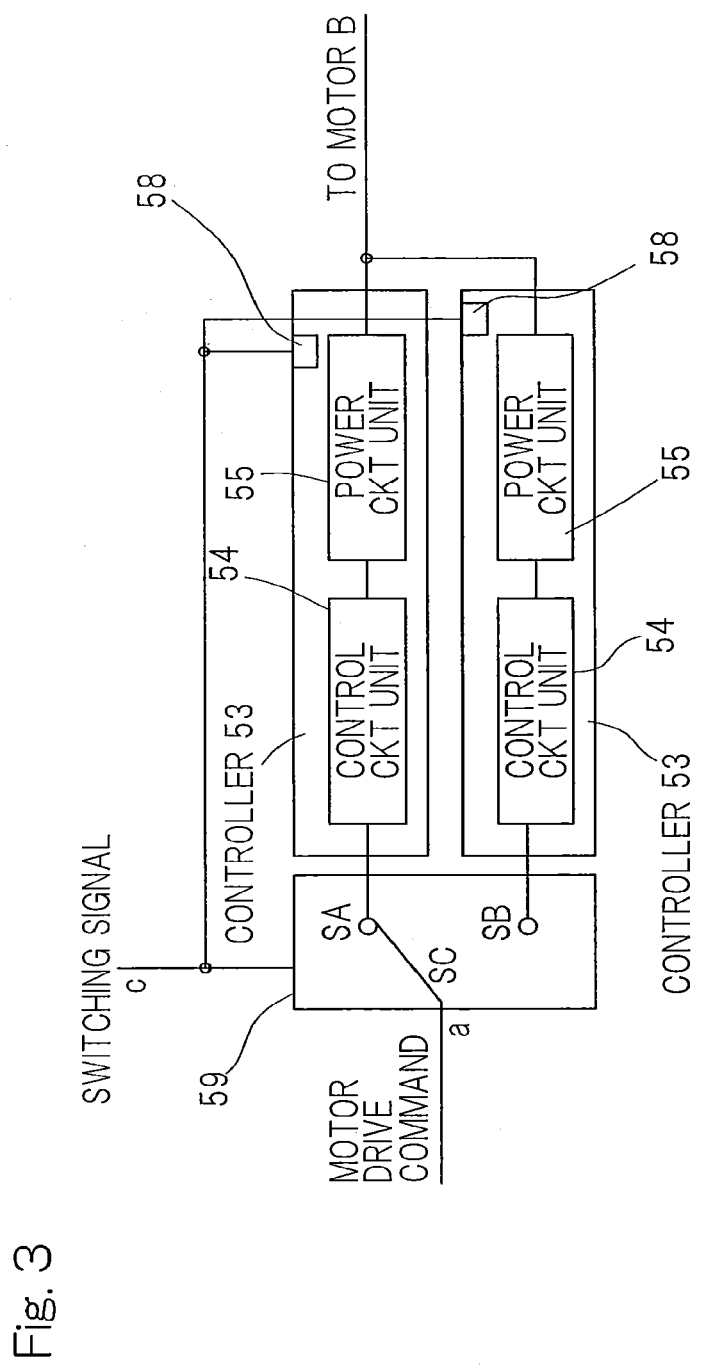
FIG. 3 is a block diagram showing a conceptual construction of the controller apparatus for an electric vehicle designed in accordance with a third preferred embodiment of the present invention.

In the third embodiment shown in FIG. 3, as the switching unit operable in response to the switching signal c, the use is made of the input side switching unit 59 and the internal side switching units 58. The input side switching unit 59 is comprised of a switching circuit operable in response to the switching signal c to switch the input terminal to which the motor drive current a is inputted between two input terminals of the respective control circuit units 54 of the two controllers 53. On the other hand, the switching units 58 on the internal side are units having the previously described functions. Other structural features are similar to those shown in and described in connection with the first embodiment of the present invention with particular reference to FIG. 1. In this construction, when the switching signal c is outputted upon detection of the abnormality, switching of the input side switching 59 is effective to switch the controller 53 then held in a condition functioning relative to the drive motor B from one to another.

Figure 4:
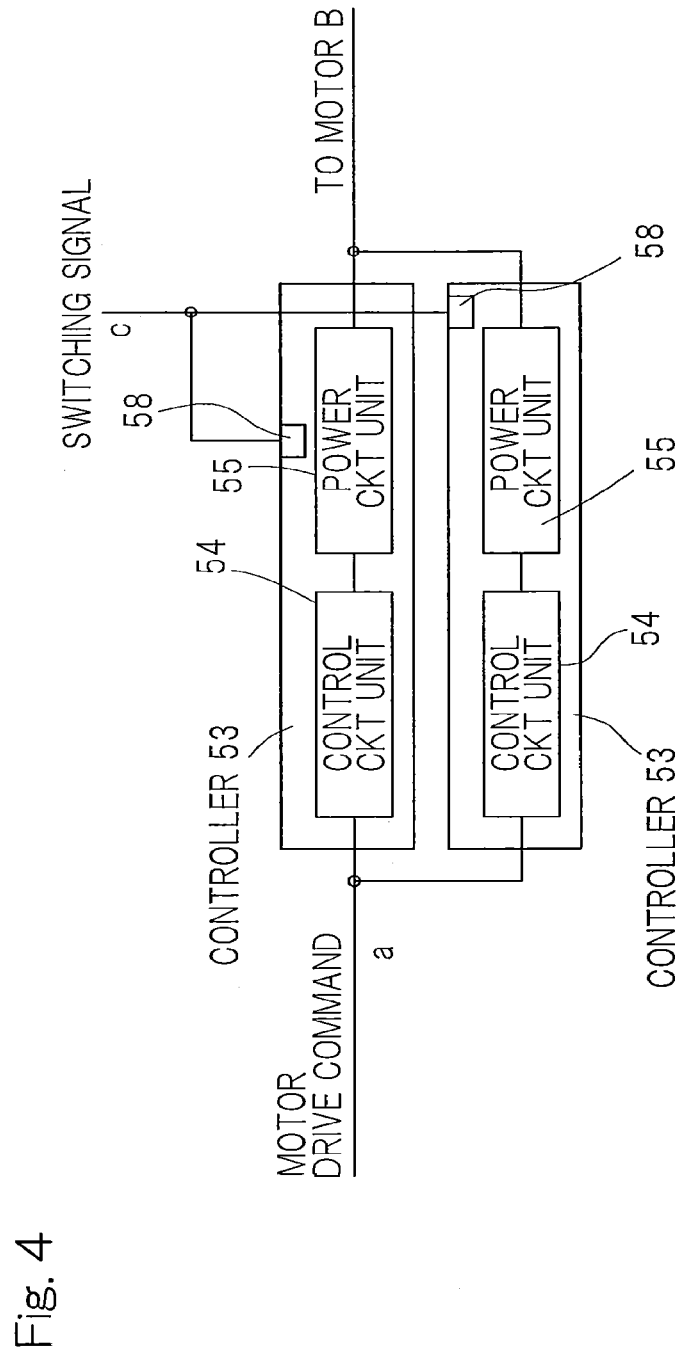
FIG. 4 is a block diagram showing a conceptual construction of the controller apparatus for an electric vehicle designed in accordance with a fourth preferred embodiment of the present invention.

In the fourth embodiment shown in FIG. 4, as the switching unit operable in response to the switching signal c, only the switching units 58 are employed on the internal side. Other structural features are similar to those shown and described in connection with the first embodiment of the present invention with particular reference to FIG. 1. In this construction, when the switching signal c is outputted upon detection of the abnormality, one of the controllers 53 then in an active mode having been connected with the power source is switched by the function of the switching units 58 on the internal side. Accordingly, the controller 53 that controls the drive motor B is thus changed.

Figure 5:
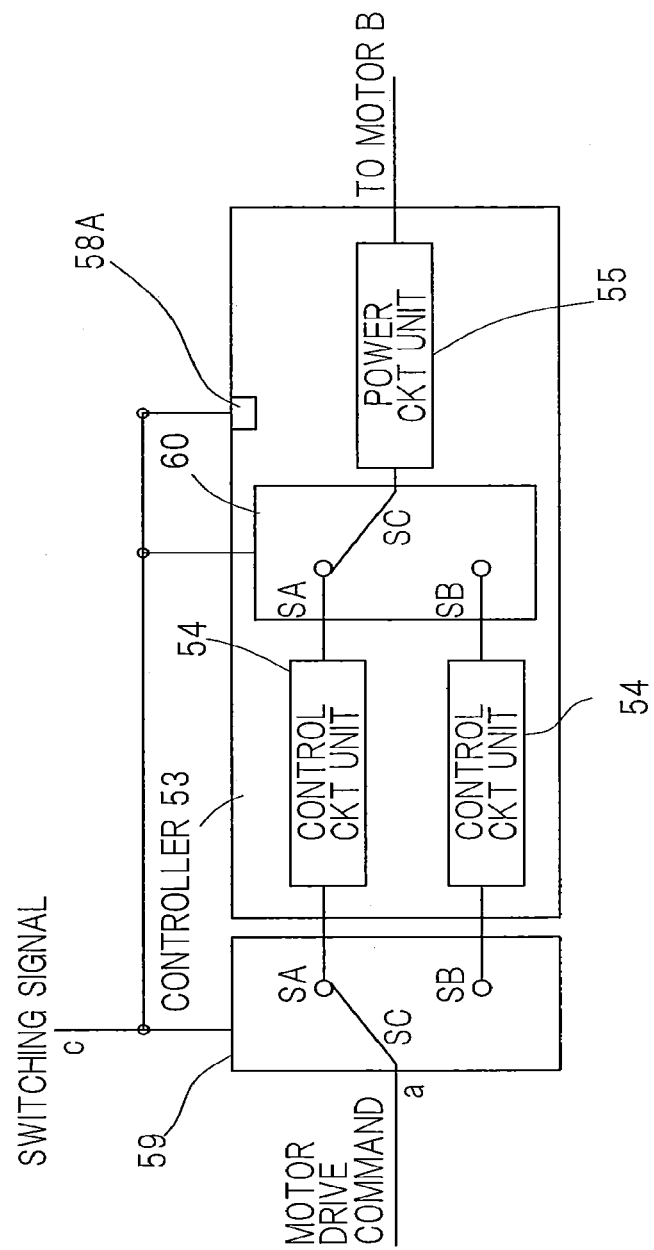
FIG. 5 is a block diagram showing a conceptual construction of the controller apparatus for an electric vehicle designed in accordance with a fifth preferred embodiment of the present invention.

In the fifth embodiment shown in FIG. 5, only one controller 53 is employed and two control circuit units 54 for controlling the power circuit unit 55 in the controller 53 are employed for selective operation one at a time. Also, as the switching unit operable in response to the switching signal c, the switching unit 59 on the input side and a switching unit 60 on an intermediate side are employed. The switching unit 59 on the input side is comprised of a switching circuit operable in response to the switching signal c to selectively connect the input of the motor drive current a to either one of the two control circuit units 54 of the controller 53. On the other hand, the switching unit 60 on the intermediate side is comprised of a switching circuit operable in response to the switching signal c to selectively connect either one of the two control circuit units 54 to the input terminal of the power circuit unit 55. Also, a switching unit 58A on an internal side is provided in the controller 53. It is to be noted that of the plurality of the control circuit units 54, it is preferred that the control circuit unit 54 that is used in the event of the abnormality may be of a circuit configuration including mainly an analog circuit having a resistance to electromagnetic noises. Other structural features in this embodiment are similar to those shown in and described with reference to FIG. 1 in connection with the first embodiment of the present invention.

In the construction shown in and described with reference to FIG. 5, when the switching unit 59 performs the switching in response to the switching signal c, the control circuit unit 54 to which the motor drive command a is inputted changes. Also, in response to the switching signal c, the contact points SA and SB on the input side of the switching unit 60 on the intermediate side switch one over the other, and therefore the control circuit unit 54, to which the motor drive command a is inputted, is connected with the control circuit unit 54. The switching unit 58A on the internal side operates in response to the switching signal c to switch over to the control circuit unit 54 which is to be held in the active mode, for example, the control circuit unit 54 which turns, for example, the power source on.

Figure 6:
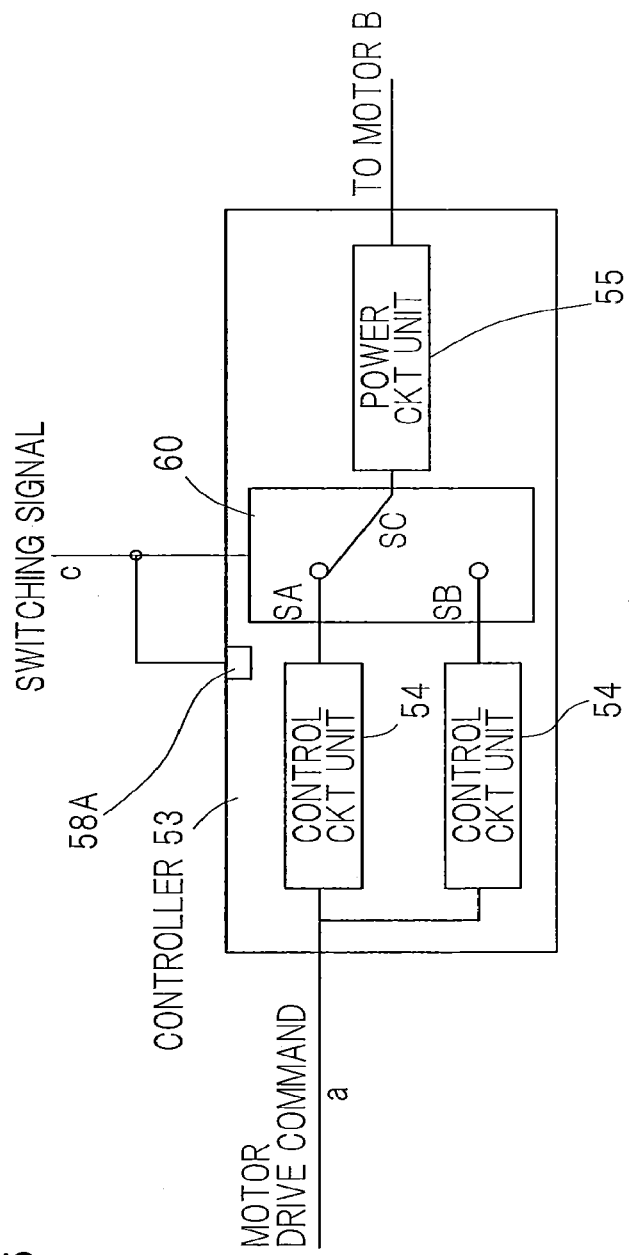
FIG. 6 is a block diagram showing a conceptual construction of the controller apparatus for an electric vehicle designed in accordance with a sixth preferred embodiment of the present invention.

The sixth embodiment shown in FIG. 6 is similar to the previously described fifth embodiment shown in FIG. 5, but differs therefrom that the switching unit 59 on the input side is dispensed with and arrangement has been made to allow the motor drive command a to be inputted at all times to both of the control circuit units 54. Other structural features are similar to those shown in and described with reference to FIG. 5 in connection with the fifth embodiment of the present invention. Although the fifth embodiment shown in and described with reference to FIG. 5 makes use of the various switching units 59, 60 and 58A in order for the operation to be further assured, even the construction in which a part of the switching units is dispensed with as shown in FIG. 6 is effective to allow the control circuit unit 54 to be switched in response to the switching signal c to perform the control.

Figure 7:
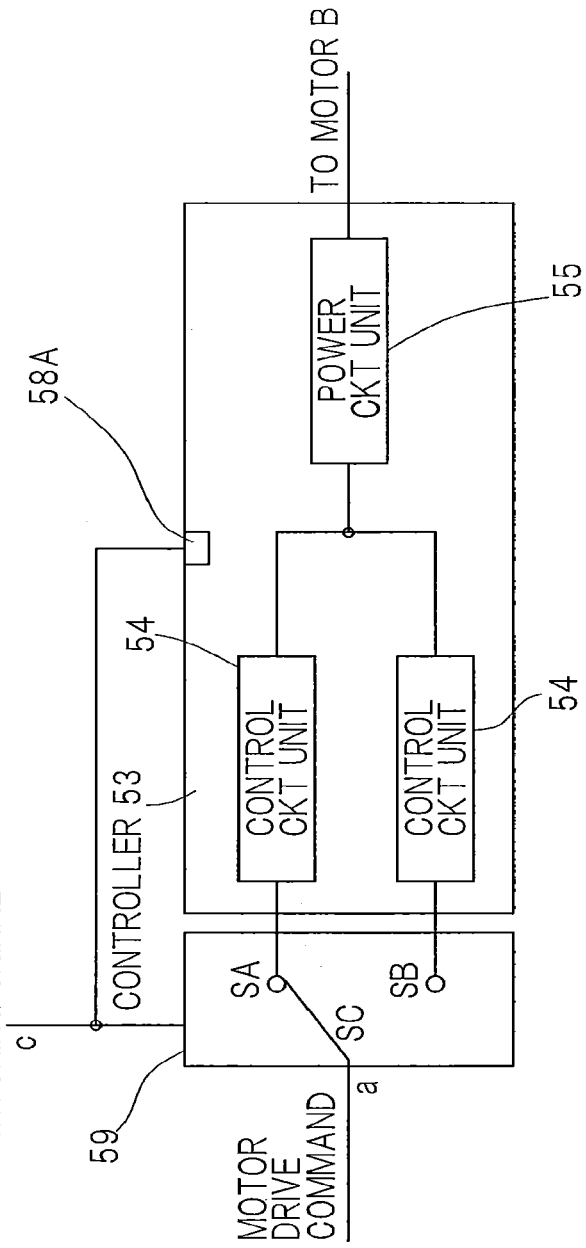
FIG. 7 is a block diagram showing a conceptual construction of the controller apparatus for an electric vehicle designed in accordance with a seventh preferred embodiment of the present invention.

The seventh embodiment shown in FIG. 7 is similar to the fifth embodiment shown in and described with reference to FIG. 5, but differs therefrom in that the switching unit 60 on the intermediate side is dispensed with and the respective output terminals of the two control circuit units 54 are held in a state connected with the power circuit unit 55 at all times. Other structural features are similar to those shown in and described with reference to FIG. 5 in connection with the fifth embodiment of the present invention. Even this construction is effective to change the control circuit unit 54 that is to be used in the event of the occurrence of the abnormality since the control circuit unit 54 to which the motor drive command a is inputted changes in response to the switching signal c.

Figure 8:
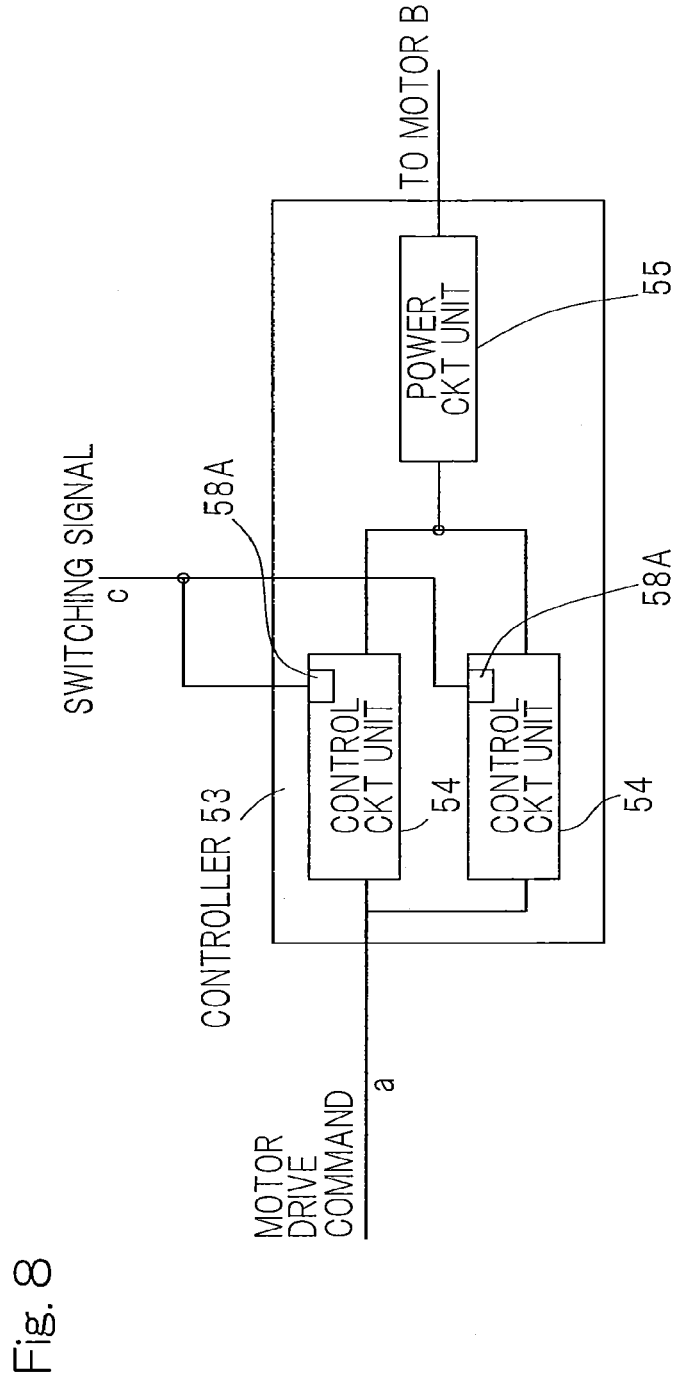
FIG. 8 is a block diagram showing a conceptual construction of the controller apparatus for an electric vehicle designed in accordance with an eighth preferred embodiment of the present invention.

The eighth embodiment shown in FIG. 8 is similar to the fifth embodiment shown in and described with reference to FIG. 5, but differs therefrom in that both of the switching units 59 and 60 on the input and intermediate sides are dispensed with and, instead, only switching units 58A on the internal side are employed. Other structural features are similar to those employed in the fifth embodiment shown in and described with reference to FIG. 5. In this construction, the control circuit unit 54 that is to be used can be switched by switching the active mode, that is, the control circuit unit 54 to be electrically powered on can be switched in response to the switching signal c.

Figure 9:
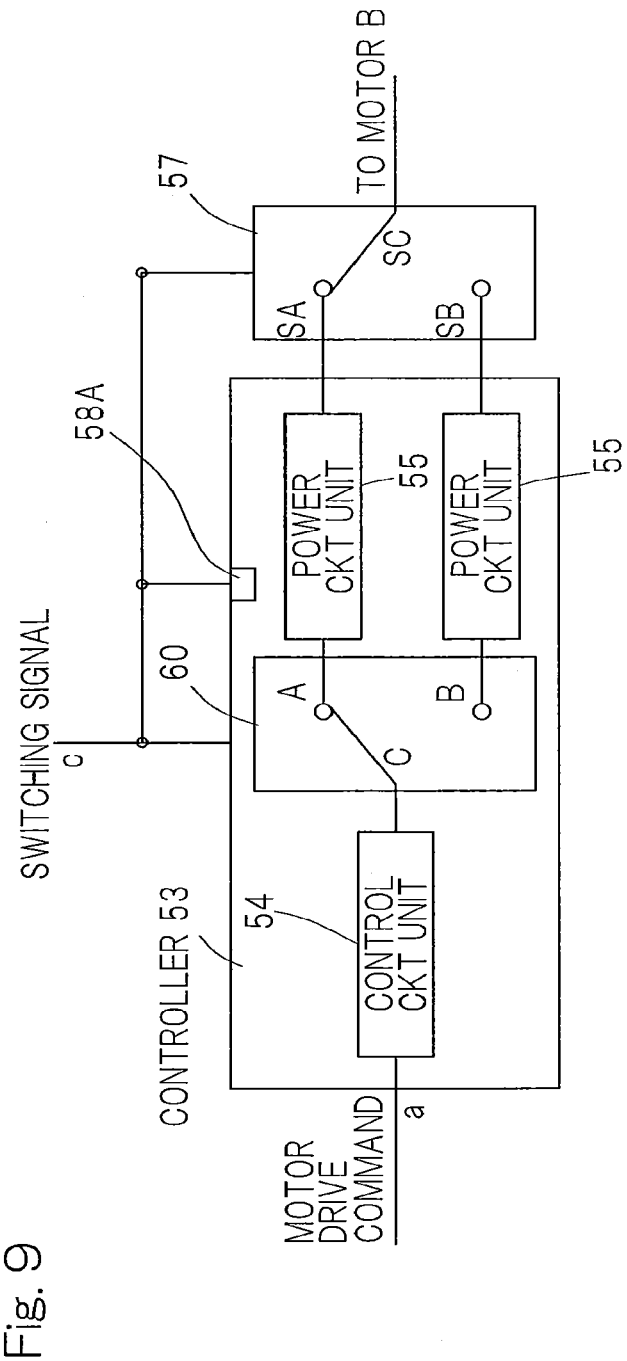
FIG. 9 is a block diagram showing a conceptual construction of the controller apparatus for an electric vehicle designed in accordance with a ninth preferred embodiment of the present invention.

The ninth embodiment shown in FIG. 9 is such that only one controller 53 is employed and the power circuit unit 55 in this controller 53 is employed in two in number so that they can be selectively enabled in use one at a time. Also, as the switching unit operable in response to the switching signal c, the switching unit 60 on the intermediate side, the switching unit 57 on the output side and the switching units 58A on the internal side are employed. The switching unit 60 on the intermediate side is comprised of a switching circuit capable of operating in response to the switching signal c to connect the output terminal of the control circuit unit 54 selectively to respective input terminals of the power circuit units 55 one at a time. The switching unit 57 on the output side is a switching circuit or the like capable of operating in response to the switching signal c to connect one of respective output terminals of the plurality of the power circuit units 55 to the input terminal of the drive motor B. The switching unit 58A on the internal side, which is employed in the practice of this embodiment, is operable to in response to the switching signal c to switch a selected one of the power circuit units 55 to be connected with the battery.

In the construction shown in and described with reference to FIG. 9, the control circuit unit 54 to be connected with one of the power circuit units 55 can be switched when the switching unit 60 on the intermediate side performs the switching in response to the switching signal c. Also, the switching unit 57 on the output side switches one of the power circuit units 55 to be selectively connected with the drive motor B in response to the switching signal c. The switching unit 58A on the internal side switches the power circuit units 55 from one to the other to be selectively connected with the battery in response to the switching signal c. Accordingly, in the event of the occurrence of an abnormality such as, for example, a failure in the power circuit unit 55 then in use, the other power circuit unit 55 can be used to continue driving of the normal drive motor.

Figure 10:
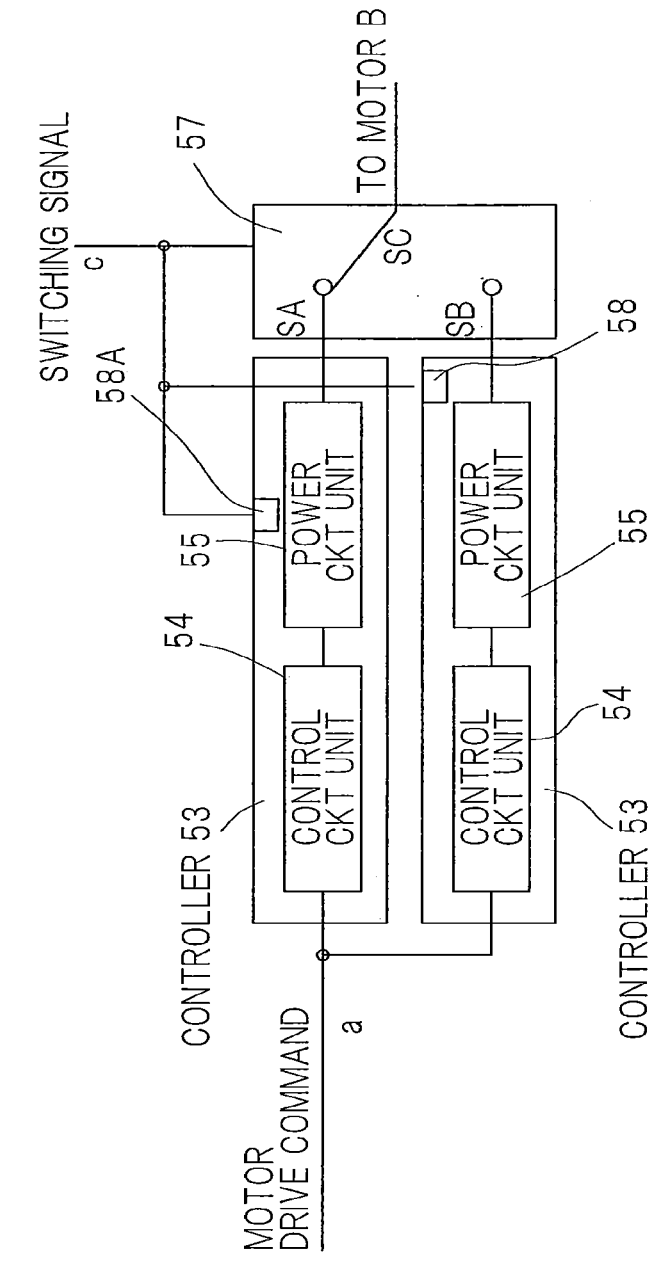
FIG. 10 is a block diagram showing a conceptual construction of the controller apparatus for an electric vehicle designed in accordance with a tenth preferred embodiment of the present invention.

The tenth embodiment shown in FIG. 10 is similar to the ninth embodiment shown in and described with reference to FIG. 9, but differs therefrom in that the switching unit 60 on the intermediate side is dispensed with and, instead, the respective output terminals of the two control circuit units 54 are held in a condition in that those two control circuit units 54 are connected with the respective power circuit units 55 at all times. Other structural features are similar to those shown in and described with reference to FIG. 9 in connection with the ninth embodiment of the present invention. Even in this construction, in response to the switching signal c, one of the power circuit units 55 to be selectively connected with the drive motor B is switched in response to the switching signal c. Accordingly, in the event of the occurrence of an abnormality such as, for example, a failure in the power circuit unit 55 then in use, the other power circuit unit 55 can be used to continue driving of the normal drive motor.

Figure 11:
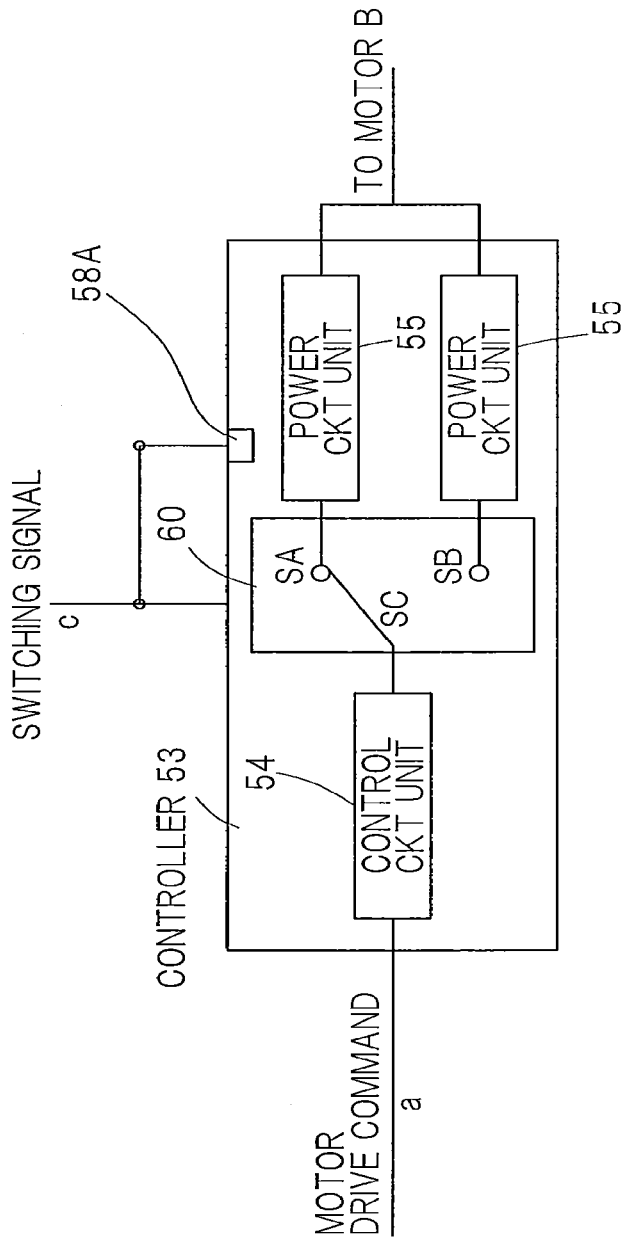
FIG. 11 is a block diagram showing a conceptual construction of the controller apparatus for an electric vehicle designed in accordance with an eleventh preferred embodiment of the present invention.

The eleventh embodiment shown in FIG. 11 is similar to the ninth embodiment shown in and described with reference to FIG. 9, but differs therefrom in that the switching unit 57 on the output side is dispensed with and, instead, the respective output terminals of the two power circuit unit 55 are connected with the drive motor B at all times. The other structural features are similar to those employed in the practice of the previously described ninth embodiment. Even in this construction, one of the power circuit units 55 to be selectively connected with the control circuit unit 54 is switched in response to the switching signal c by the switching unit 60 on the intermediate side. For this reason, the drive motor B is driven by the switched power circuit unit 55. Accordingly, in the event of the occurrence of an abnormality such as, for example, a failure in the power circuit unit 55 then in use, the other power circuit unit 55 is used to continue driving of the normal drive motor.

Figure 12:
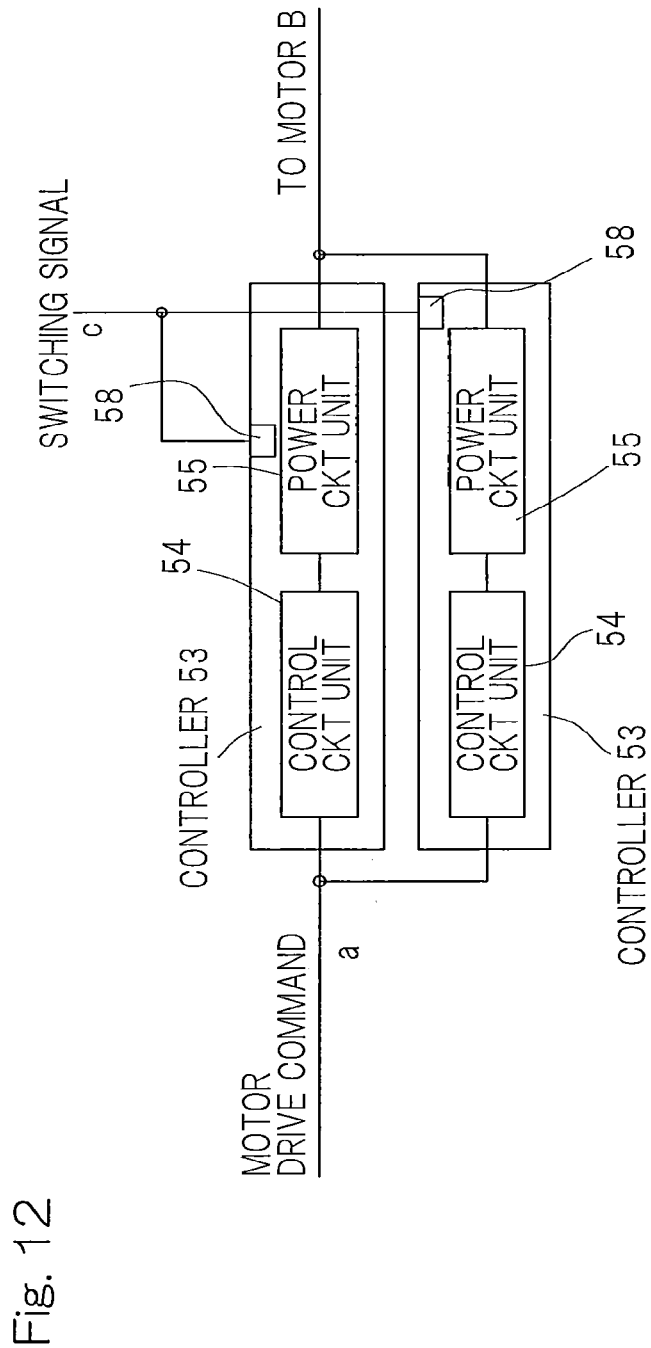
FIG. 12 is a block diagram showing a conceptual construction of the controller apparatus for an electric vehicle designed in accordance with a twelfth preferred embodiment of the present invention.

The twelfth embodiment shown in FIG. 12 is similar to the first embodiment shown in and described with reference to FIG. 1, but differs therefrom in that as the switching unit only the switching units 58 on the internal side are employed. Other structural features are similar to those employed in the practice of the previously described first embodiment. In this construction, the control circuit unit 54, that is electrically powered on, and the power circuit unit 55, that is held in a condition connected with the battery, are switched. For this reason, in the event of an abnormality such as, for example, a failure in the controller 53 then in use, the other controller 53 can be used to continue driving of the normal drive motor.

Figure 13:
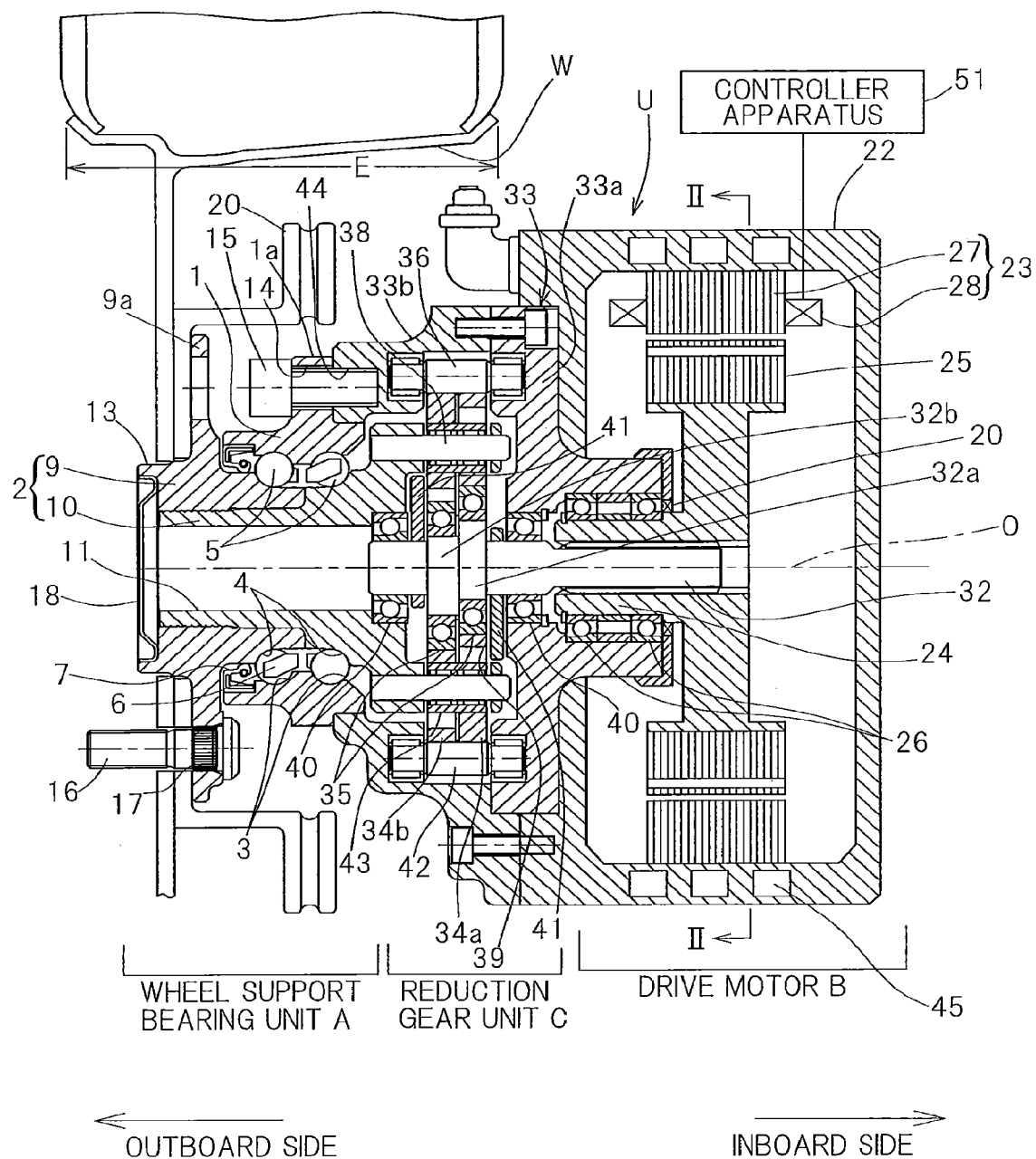
FIG. 13 is a longitudinal sectional view showing an assembly of the drive motor, for which the controller apparatus for an electric vehicle designed in accordance with any one of the first to twelfth embodiments of the present invention is used, the reduction gear unit and the wheel support bearing unit.

In the next place, with particular reference to FIGS. 13 to 15, a specific example of the in-wheel motor drive mechanism will be described. FIG. 13 illustrates the in-wheel motor drive mechanism of a structure, in which the reduction gear unit C is interposed between the wheel support bearing unit A for the electric vehicle and the drive motor B and a hub supported by the wheel support bearing unit A and an output shaft 24 of the drive motor B are connected coaxially with each other. The wheel support bearing unit A, the drive motor B and the reduction gear unit C are assembled into an unitary structure to provide an in-wheel motor assembly U. The wheel support bearing unit A is fixed to a vehicle body through a suspension device (not shown) such as, for example, a knuckle at an outer peripheral portion of a housing 22 for the drive motor B or a housing 33b for the reduction gear unit C. The drive motor B referred to above is driven by the controller apparatus 51 for the electric vehicle as hereinbefore described.

The reduction gear unit C is of a type having a reduction gear ratio of 5 factors or higher and, preferably, 8 factors or higher. In the example as shown, the reduction gear unit C is employed in the form of a cycloidal gear reducer and an input shaft 32 coaxially connected with an output shaft 24 of the drive motor B is formed with axially spaced eccentric portions 32a and 32b, with curved plates 34a and 34b mounted on the respective eccentric portions 32a and 32b through associated bearing units 35, such that respective eccentric motions of those curved plates 34a and 34b can be transmitted as a rotational motion to the wheel support bearing unit A.

In other words, by employing the reduction gear unit C in the form of the cycloidal gear reducer of a kind in which the rotation of the drive motor B is rendered to be the respective eccentric motions of the curved plates 34a and 34b and those eccentric motions are transmitted as the rotational motion to the hub, the reduction gear unit C, which is compact in structure and is capable of providing a high reduction gear ratio, and a compactly arranged structure of the reduction gear unit C can be designed compactly and the reduction gear ratio of or high can be obtained for one stage.

A specific structural example of a mechanical portion of the in-wheel motor assembly U will now be described. It is, however, to be noted that in describing the present invention in this specification, terms "outboard" and "inboard" represent one side of the vehicle body away from the longitudinal center of the vehicle body and the other side of the vehicle body close to the longitudinal center of the vehicle body, respectively, when assembled in the vehicle body. The wheel support bearing unit A is in the form of a third generation model of a hub bearing unit of an inner ring rotating type, in which an inner member 2 having a rolling surface of a bearing defined therein constitutes a hub.

The wheel support bearing unit A referred to above includes an outer member 1 having an inner periphery formed with a plurality of rows of rolling surfaces 3, an inner member 2 having an outer periphery formed with rolling surfaces 4 held in face to face relation to those rolling surfaces 3, and a plurality of rows of rolling elements 5 that are interposed between the rolling surfaces 3 in the outer member 1 and the rolling surfaces 4 in the inner member 2. The inner member 2 concurrently serves as a hub on which the vehicle wheel is mounted. The wheel support bearing unit A is rendered to be a double row angular contact ball bearing, in which the rolling elements 5 are employed in the form of balls that are rollingly retained by a ball retainer 6 employed for each row. The rolling surfaces 3 and 4 referred to above are of an arcuately sectioned configuration and are so formed as to have respective contact angles held in back-to-back relation with each other. An annular bearing space is delimited between the outer member 1 and the inner member 2 positioned inside the outer member 1, and an outboard open end of the annular bearing space so delimited is sealed by a sealing member 7.

The outer member 1 is of a kind that will become a stationary raceway ring and is also rendered to be of one piece construction having a flange 1a to be fitted to a housing 33b on the outboard side of the reduction gear unit C. This flange 1a has bolt insertion holes 14 defined at a plurality of circumferential locations thereof, respectively. Also, the housing 33b is provided with bolt threading holes 44, each having an inner periphery helically threaded, at locations alignable with the bolt insertion holes 14, respectively. When mounting bolts 15 inserted through the respective bolt insertion holes 14 are threadingly engaged in the respective bolt threading holes 44, the outer member 1 is fitted to the housing 33b.

The inner member 2 includes an outboard member 9 having a hub flange 9a for the support of an automotive wheel (not shown) and an inboard member 10 having an outboard side mounted on an inner periphery of the outboard member 9 and integrated together with the outboard member 9 by means of crimping. The rolling surfaces 4 of each row are formed in the outboard member 9 and the inboard member 10, respectively. The inboard member 10 has a center bore 11 defined in its center portion. The hub flange 9a is provided with press fitting holes 17 at a plurality of circumferential locations, respectively, for receiving therein corresponding hub bolts 16. A cylindrical pilot portion 13 for guiding the automotive drive wheel W and a brake component 20 is defined in the vicinity of a root portion of the hub flange 9a in the outboard member 9 so as to protrude towards the outboard side. This pilot portion 13 has an inner periphery to which a cap 18 is fitted for closing an outboard opening of the center bore 11.

The drive motor B is of a radial gap type, in which a radial gap is provided between a stator 23, fixed to the tubular housing 22, and a rotor 25 mounted on the output shaft 24. The output shaft 24 is supported in a cantilever fashion by a tubular portion of the housing 33a on the inboard side of the reduction gear unit C by means of two axially spaced bearings 26. An inboard end of a gap delimited between the output shaft 24 and the housing 33a is sealed by a sealing member 20. A peripheral wall portion of the housing 22 is provided with a cooling medium passage 45 defined over the entire periphery thereof. This cooling medium passage 45 contains a cooling medium such as, for example, an oil or a water soluble cooling agent that is circulated by a supply drive system (not shown) such as, for example, a pump.

Figure 14:
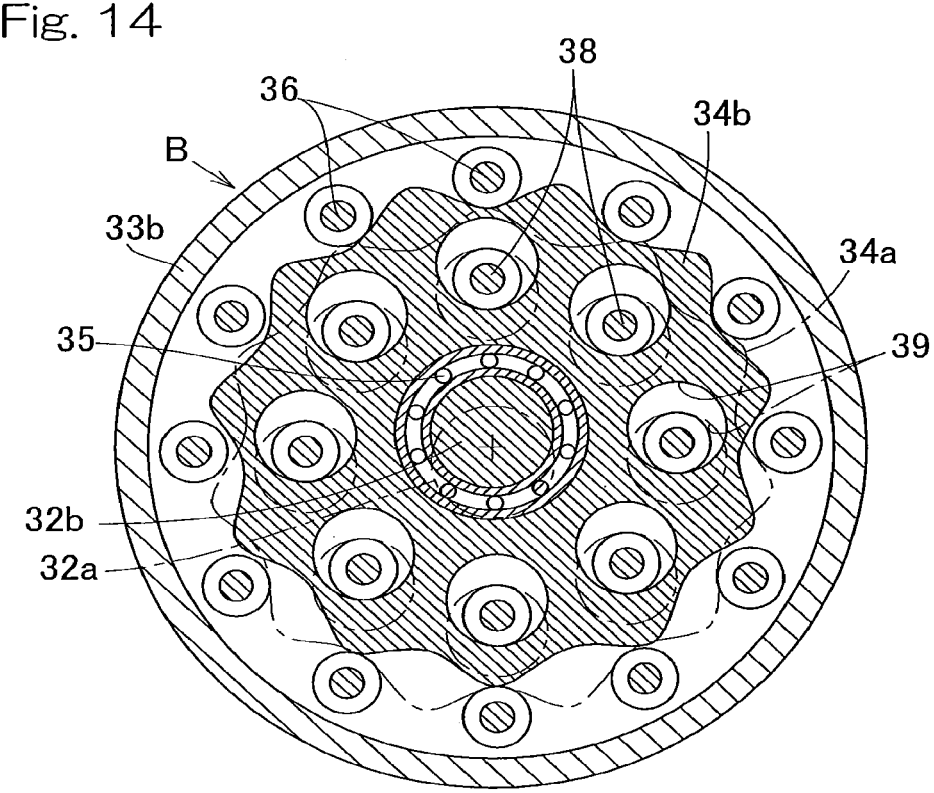
FIG. 14 is a fragmentary transverse sectional view showing the reduction gear unit.

The reduction gear unit C is the cycloidal gear reducer as hereinbefore described and includes, as shown in FIG. 14, the curved plates 34a and 34b, which have respective contours that are smoothly undulated so as to depict the trochoidal curve and are mounted on the respective eccentric portions 32a and 32b through the associated bearing units 35. A plurality of outer pins 36 for guiding the respective eccentric motions of the curved plates 34a and 34b on an outer peripheral side are provided having been engaged at their opposite ends with the housing 33b, and a plurality of inner pins 38 fitted to the inboard member 10 of the inner member 2 are engaged having been inserted in a corresponding number of round sectioned throughholes 39 defined inside each of the curved plates 34a and 34b. The input shaft 32 referred to above is drivingly splined to the output shaft 24 of the drive motor B and is therefore rotatable together with the latter. It is to be noted that the input shaft 32 referred to above is rotatably supported in both end supported fashion by an inner diametric surface of the inboard side housing 33a and an inner diametric surface of the inboard member 10 of the inner member 2 through axially spaced two bearings 40. The reduction gear unit C is positioned within the wheel W, that is, within the range of the width E of the vehicle wheel W and is held in position not to protrude outwardly from the wheel W in a direction parallel to a wheel axis O.

As the output shaft 24 of the drive motor B rotates, the curved plates 34a and 34b mounted on the input shaft 32 that is integrally rotatable together therewith undergo respective eccentric motions. These eccentric motions of the curved plates 34a and 34b are transmitted as a rotational motion to the inner member 2 through the engagement between the inner pins 38 and the throughholes 39. The rotation of the inner member 2 is reduced in speed relative to the rotation of the output shaft 24.

The two curved plates 34a and 34b are mounted on the eccentric portions 32a and 32b of the input shaft 32, respectively, having been offset 180° in phase relative to each other so that those eccentric motions can be counterbalanced with each other. Counterweights 41 are mounted on both sides of the eccentric portions 32a and 32b and is displaced in a direction counter to the direction of eccentricity of the associated eccentric portion 32a and 32b so that vibrations induced by the eccentric motion of each of the curved plates 34a and 34b can be counteracted.

Figure 15:
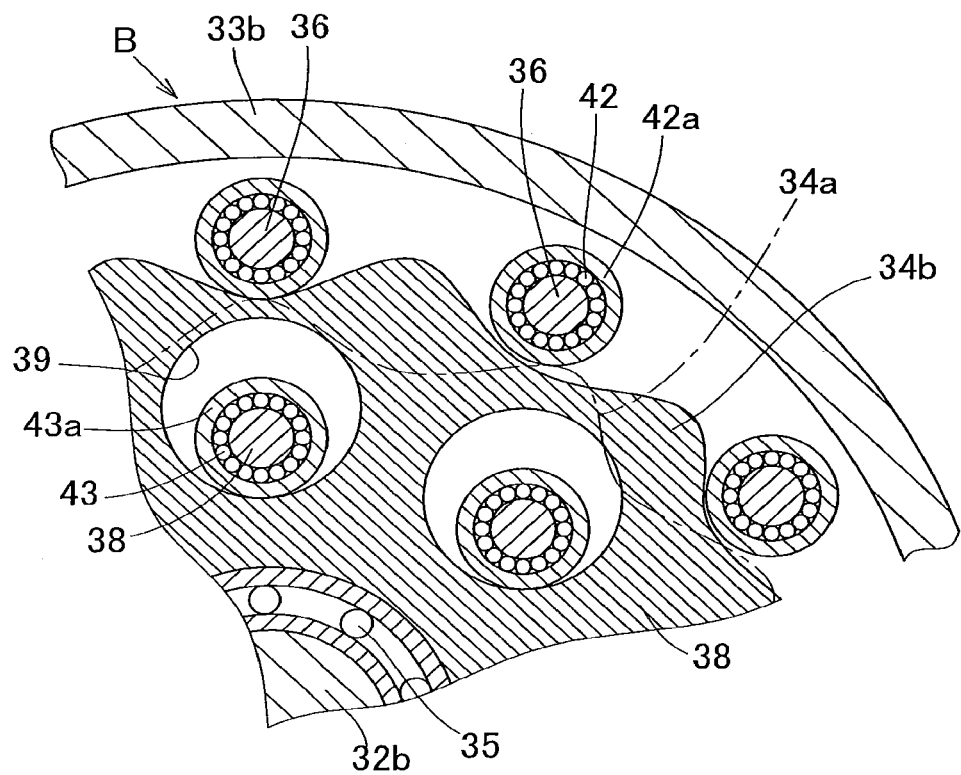
FIG. 15 is a fragmentary enlarged diagram showing a portion of the reduction gear unit shown in FIG. 14.
Figure 16:
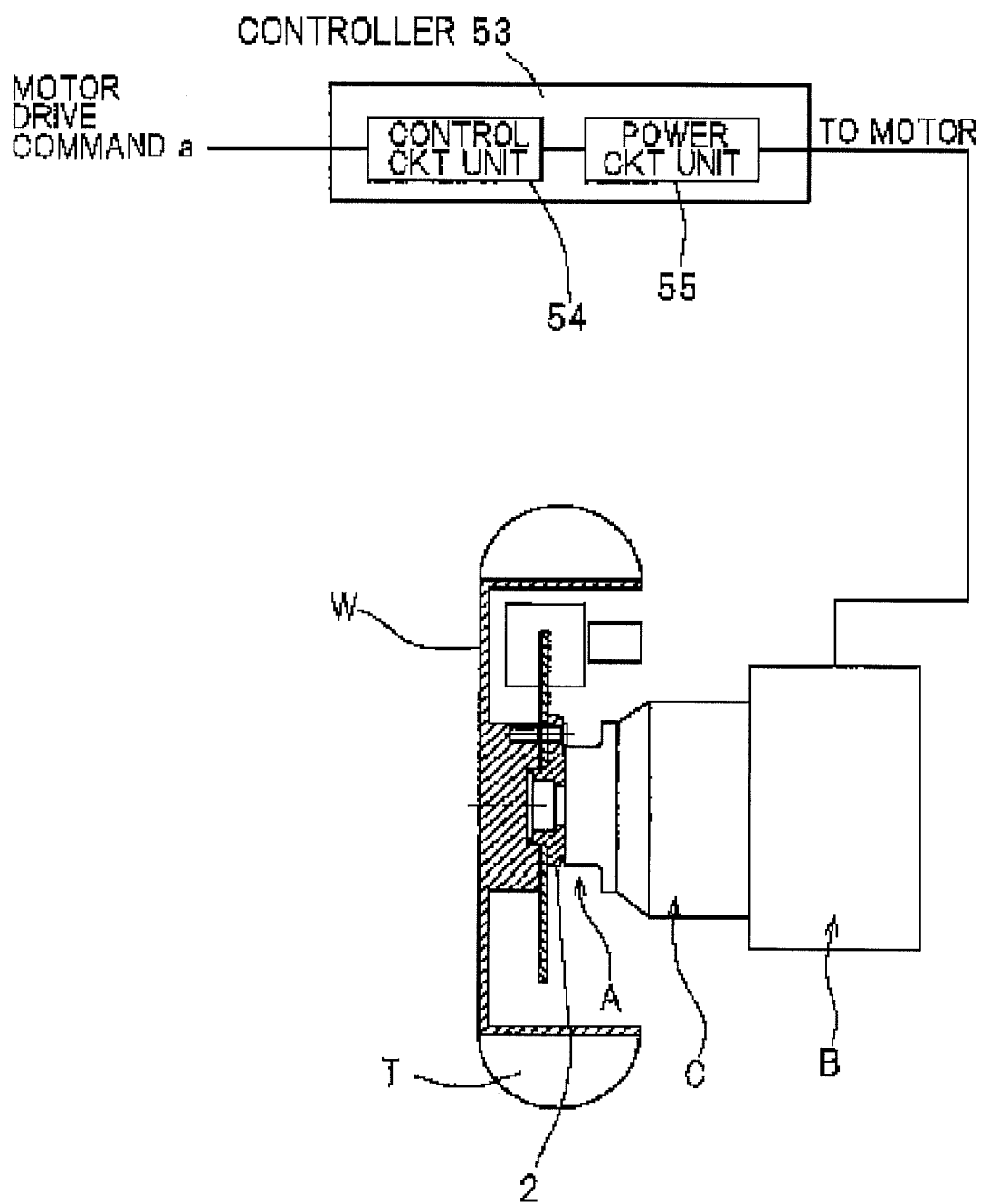
FIG. 16 is a diagram showing a conceptual construction of the conventional controller apparatus for an electric vehicle, and a longitudinal sectional view with a portion cut out of the drive motor, the reduction gear unit, the wheel support bearing unit and the wheel.

As shown on an enlarged scale in FIG. 15, respective bearing units 42 and 43 are mounted on the outer and inner pins 36 and 38, and outer rings 42a and 43a of those outer and inner pins 36 and 38 are held in rolling contact with the outer peripheries of the curved plates 34a and 34b and inner peripheries of the throughholes 39, respectively. Accordingly, the respective eccentric motions of the curved plates 34a and 34b can be smoothly transmitted as the rotational motion to the inner member 2 while the resistance of contact between the outer pins 36 and the outer peripheries of the curved plates 34a and 34b and the resistance of contact between the inner pins 38 and the inner peripheries of the throughholes 39 are reduced.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

REFERENCE NUMERALS

51 . . . Controller apparatus for an electrically powered automotive vehicle
52 . . . Electric control unit
53 . . . Controller
54 . . . Control circuit unit
55 . . . Power circuit unit
56 . . . Abnormality determining unit
57 . . . Switching unit on the output side
58 . . . Switching unit on the internal side
58A . . . Switching unit on the internal side
59 . . . Switching unit on the input side 60 . . . Switching unit on the intermediate side
A . . . Wheel support bearing unit
B . . . Drive motor
C . . . Reduction gear unit
U . . . In-wheel motor drive mechanism (Assembly)

What is claimed is:

1. A controller apparatus for a drive motor for driving an electrically powered automotive vehicle, which controller apparatus comprises:
    a plurality of controllers each including a power circuit unit for outputting an electric drive current for the drive motor and a control circuit unit, which is a light electric circuit, for controlling the power circuit unit in response to a motor drive command fed from a higher control unit;
    an abnormality determining unit for determining an abnormality occurring in the controller then in use according to a prescribed rule and then generating a switching signal; and
    a switching unit operable in response to the switching signal, outputted from the abnormality determining unit, to change the controller then in a state of functioning relative to the drive motor,
    wherein the drive motor transmits torque to a vehicle wheel of the electrically powered automotive vehicle through a reduction gear unit, and
    the reduction gear unit, the drive motor and a wheel support bearing unit are assembled together to define an in-wheel motor drive mechanism.

2. The controller apparatus as claimed in claim 1, in which wherein the control circuit unit in each of the plurality of the controllers is electrically powered on at all times and is held in a standby state with the motor drive command inputted thereto and in which in the event that the abnormality determining unit determines that the controller then in use is abnormal and therefore generates the switching signal, the switching unit causes another controller in a state of functioning relative to the drive motor.

3. The controller apparatus as claimed in claim 1, wherein the reduction gear unit has a reduction gear ratio of 8 or higher.

4. The controller apparatus as claimed in claim 3, wherein the reduction gear unit is a cycloidal gear reducer.

5. The controller apparatus as claimed in claim 3, wherein the reduction gear unit is positioned within the vehicle wheel.

6. A controller apparatus for a drive motor for driving an electrically powered automotive vehicle, which controller apparatus comprises:
    a controller including a power circuit unit for outputting an electric drive current for the drive motor and a control circuit unit, which is a light electric circuit, for controlling the power circuit unit in response to a motor drive command fed from a higher control unit, the controller having, as the control circuit unit, a plurality of control circuit units that are selectively used relative to the same power circuit unit;
    an abnormality determining unit for determining an abnormality occurring in the control circuit unit then in use according to a prescribed rule and then generating a switching signal; and
    a switching unit operable in response to the switching signal, outputted from the abnormality determining unit, to switch over to a different control circuit unit then in a state capable of functioning relative to the power circuit unit,
    wherein the drive motor transmits torque to a vehicle wheel of the electrically powered automotive vehicle through a reduction gear unit, and
    the reduction gear unit, the drive motor and a wheel support bearing unit are assembled together to define an in-wheel motor drive mechanism.

7. The controller apparatus as claimed in claim 6, wherein of the plurality of the control circuit units, the control circuit unit that is used at the time of the abnormality is a circuit configuration having a resistance to electromagnetic noises.

8. The controller apparatus as claimed in claim 6, wherein the plurality of the control circuit units are held in standby state by being electrically powered on at all times and in which in the event that the abnormality determining unit determines that the control circuit unit then in use is abnormal and therefore generates the switching signal, the switching unit causes the different controller in a state of functioning relative to the drive motor.

9. The controller apparatus as claimed in claim 6, wherein the reduction gear unit has a reduction gear ratio of 8 or higher.

10. The controller apparatus as claimed in claim 9, wherein the reduction gear unit is a cycloidal gear reducer.

11. The controller apparatus as claimed in claim 9, wherein the reduction gear unit is positioned within the vehicle wheel.

12. A controller apparatus for a drive motor for driving an electrically powered automotive vehicle, which controller apparatus comprises:
    a controller including a power circuit unit for outputting an electric drive current for a drive motor and a control circuit unit, which is a light electric circuit, for controlling the power circuit unit in response to a motor drive command fed from a higher control unit; the controller having, as the power circuit unit, a plurality of power circuit units that are selectively used relative to the same control circuit unit;
    an abnormality determining unit for determining an abnormality occurring in the power circuit then in use according to a prescribed rule and then generating a switching signal; and
    a switching unit operable in response to the switching signal, outputted from the abnormality determining unit, to change the power circuit unit then in a state of functioning relative to the drive motor,
    wherein the drive motor transmits torque to a vehicle wheel of the electrically powered automotive vehicle through a reduction gear unit, and
    the reduction gear unit, the drive motor and a wheel support bearing unit are assembled together to define an in-wheel motor drive mechanism.

13. The controller apparatus as claimed in claim 12, wherein the reduction gear unit has a reduction gear ratio of 8 or higher.

14. The controller apparatus as claimed in claim 13, wherein the reduction gear unit is a cycloidal gear reducer.

15. The controller apparatus as claimed in claim 13, wherein the reduction gear unit is positioned within the vehicle wheel.

* * * * *

UNITED STATES PATENT AND TRADEMARK OFFICE
CERTIFICATE OF CORRECTION

PATENT NO. : 8,558,499 B2  
APPLICATION NO. : 13/613670  
DATED : October 15, 2013  
INVENTOR(S) : Takayoshi Ozaki et al.

Page 1 of 1

It is certified that error appears in the above-identified patent and that said Letters Patent is hereby corrected as shown below:

On the Title Page, In Column 2 (Primary Examiner), Line 1, Delete "Anthony" and insert
-- Antony --, therefor.
In the Claims
In Column 15, Line 30, In Claim 2, after "claim 1," delete "in which".

Signed and Sealed this
Eighteenth Day of February, 2014

Michelle K. Lee
*Deputy Director of the United States Patent and Trademark Office*